(12) United States Patent
Wei

(10) Patent No.: US 7,913,396 B2
(45) Date of Patent: Mar. 29, 2011

(54) ADJUSTABLE CAKE CUTTER

(76) Inventor: Shao-Tsung Wei, Yunghe (TW)

( * ) Notice: Subject to any disclaimer, the term of this patent is extended or adjusted under 35 U.S.C. 154(b) by 387 days.

(21) Appl. No.: 12/145,517

(22) Filed: Jun. 25, 2008

(65) Prior Publication Data
US 2009/0320298 A1  Dec. 31, 2009

(51) Int. Cl.
*A21C 5/08* (2006.01)
(52) U.S. Cl. ............. 30/114; 30/136.5; 30/283; 30/303; 99/537
(58) Field of Classification Search ......... 30/113.1–114, 30/121.5, 122, 124, 136.5, 173, 174, 279.2, 30/283, 290, 293, 303, 339, 342, 351, 514, 30/517; 83/932; 99/537, 543, 545; 294/50, 294/50.8, 51, 99.2; D7/669, 673, 686, 687, D7/693
See application file for complete search history.

(56) References Cited

U.S. PATENT DOCUMENTS

| | | | | | |
|---|---|---|---|---|---|
| 1,249,752 | A | * | 12/1917 | Hathaway | 30/303 |
| 1,931,388 | A | * | 10/1933 | Ling | 30/114 |
| 2,182,726 | A | * | 12/1939 | King et al. | 30/114 |
| 2,496,908 | A | * | 2/1950 | Doux | 294/50 |
| 2,555,690 | A | * | 6/1951 | Guerra | 30/114 |
| 2,770,035 | A | * | 11/1956 | O'Brien | 30/114 |
| 2,800,714 | A | * | 7/1957 | Evans | 30/114 |
| 2,841,868 | A | * | 7/1958 | O'Brien | 30/114 |
| 4,592,139 | A | * | 6/1986 | Huang | 30/114 |
| 4,637,138 | A | * | 1/1987 | Piche | 30/114 |
| 4,759,125 | A | * | 7/1988 | Olaes | 30/114 |
| 4,847,998 | A | * | 7/1989 | Colozzi et al. | 30/114 |
| 5,903,981 | A | * | 5/1999 | Grow, II | 30/114 |

* cited by examiner

*Primary Examiner* — Edward Landrum
(74) *Attorney, Agent, or Firm* — Leong C. Lei

(57) ABSTRACT

An adjustable cake cutter includes an one-piece cutter body that allows adjustment of the cut size, and a bearing bar pivoted to the cutter body and turnable to the bottom side of the space defined within the cutter body to bear the cut piece of cake for enabling the user to carry the cut piece of cake to a dish directly with the adjustable cake cutter.

3 Claims, 9 Drawing Sheets

ADJUSTABLE CAKE CUTTER

BACKGROUND OF THE INVENTION (a) Technical Field of the Invention

The present invention relates to a cake cutter for cutting a cake into equal pieces and more particularly, to an adjustable cake cutter that allows adjustment of the cut size and also allows the user to carry the cut piece of cake to a dish directly with the adjustable cake cutter.

(b) Description of the Prior Art

Regular cakes generally have a circular shape. When dividing a cake into multiple pieces for different persons, a cutter is used to cut the cake along the diameter or radius and then to cut the cake into slices.

When purchasing a birthday cake from a cake shop, the shop assistant will attach a disposable cake cutter. A disposable cake cutter is simply a plastic cutting blade. It is difficult to cut a cake into equal slices with a cutting blade or knife. Further, when picking up one slice of cake with the cutting blade or knife directly after cutting, the slice of cake may fall from the cutting blade or knife accidentally.

Some people may use a clip to pick up the cut slice of cake. However, it is difficult to control the clamping force of the clip when picking up the cut slice of cake. The cut slice of cake may fall from the clip if the clamping force is insufficient, or deformed by the clip if an excessive force is applied to the clip.

SUMMARY OF THE INVENTION

The primary purpose of the present invention is to provide an adjustable cake cutter, which is practical for use to cut a cake into equal cut pieces of cake. It is another object of the present invention to provide an adjustable cake cutter, which allows the user to pick up the cut piece of cake and to carry the cut piece of cake to a dish with the adjustable cake cutter directly, avoiding falling of the cut piece of cake. It is still another object of the present invention to provide an adjustable cake cutter, which allows the user to adjust the cut size.

To achieve these and other objects of the present invention, the adjustable cake cutter is comprised of a cutter body made of a metal sheet member through a metal stamping and bending process, a bearing bar, and a lever. The cutter body comprises a first cutter blade, a second cutter blade that is connectable with its one end to one end of the first cutter blade, a V-shaped handle, a first shoulder and a second shoulder respectively connected between the two opposite ends of the V-shaped handle and the other end of the first cutter blade and the other end of the second cutter blade, a connection arm extending from the connection between one end of the V-shaped handle and the first shoulder and selectively connectable to one of a series of locating holes in the second shoulder. The bearing bar is pivoted to the bottom side of the first shoulder for bearing a cut piece of cake being cut from a cake by the first cutter blade and the second cutter blade. The lever is connected to one end of the bearing bar for operation by a person to move the bearing bar in and out of the bottom side of the space surrounded by the first cutter blade, the second cutter blade, the first shoulder and the second shoulder.

The adjustable cake cutter further comprises a torsional spring connected between the bearing bar and the cutter body to impart a biasing forced to the bearing bar, holding the bearing bar in the non-operative position beyond the space surrounded by the first cutter blade, the second cutter blade, the first shoulder and the second shoulder.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
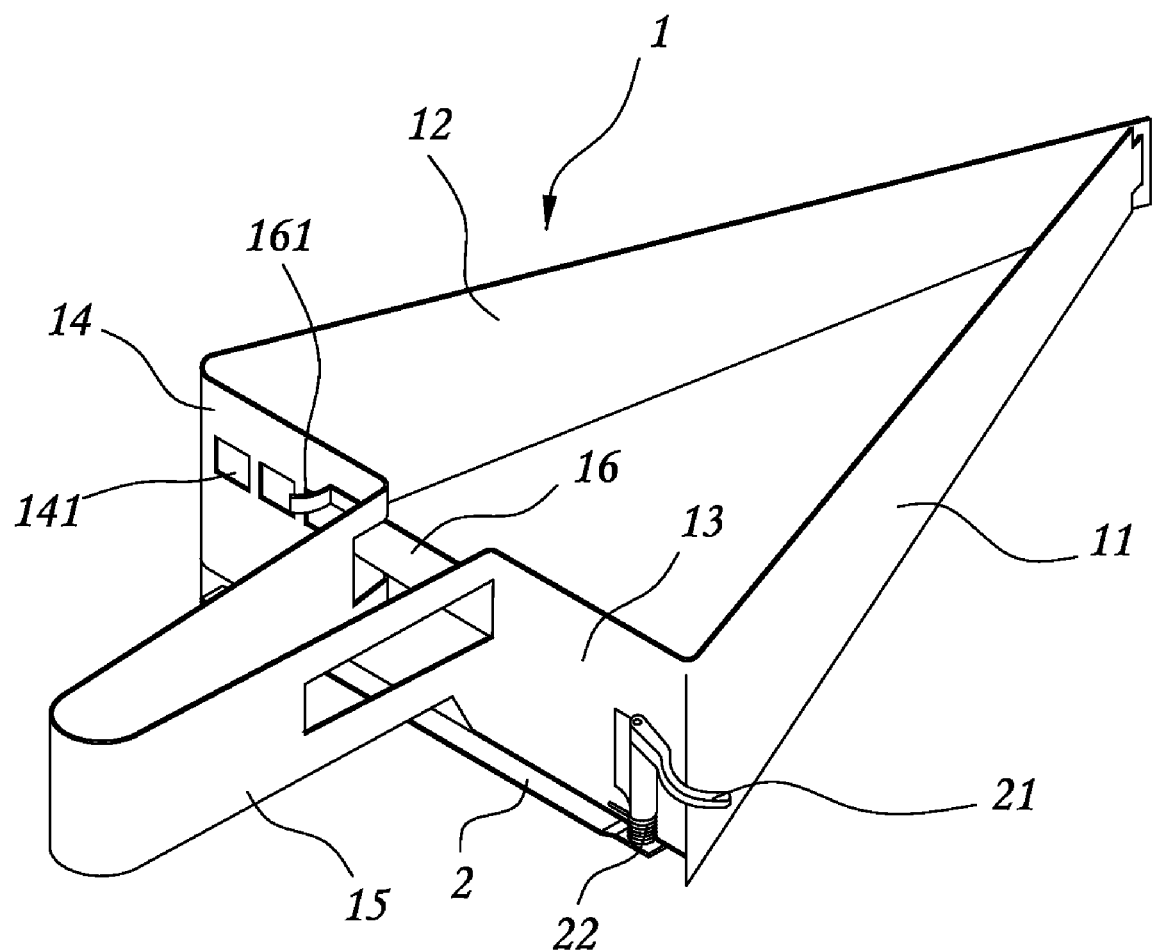
FIG. 1 is an oblique elevation of an adjustable cake cutter in accordance with the present invention.
Figure 2:
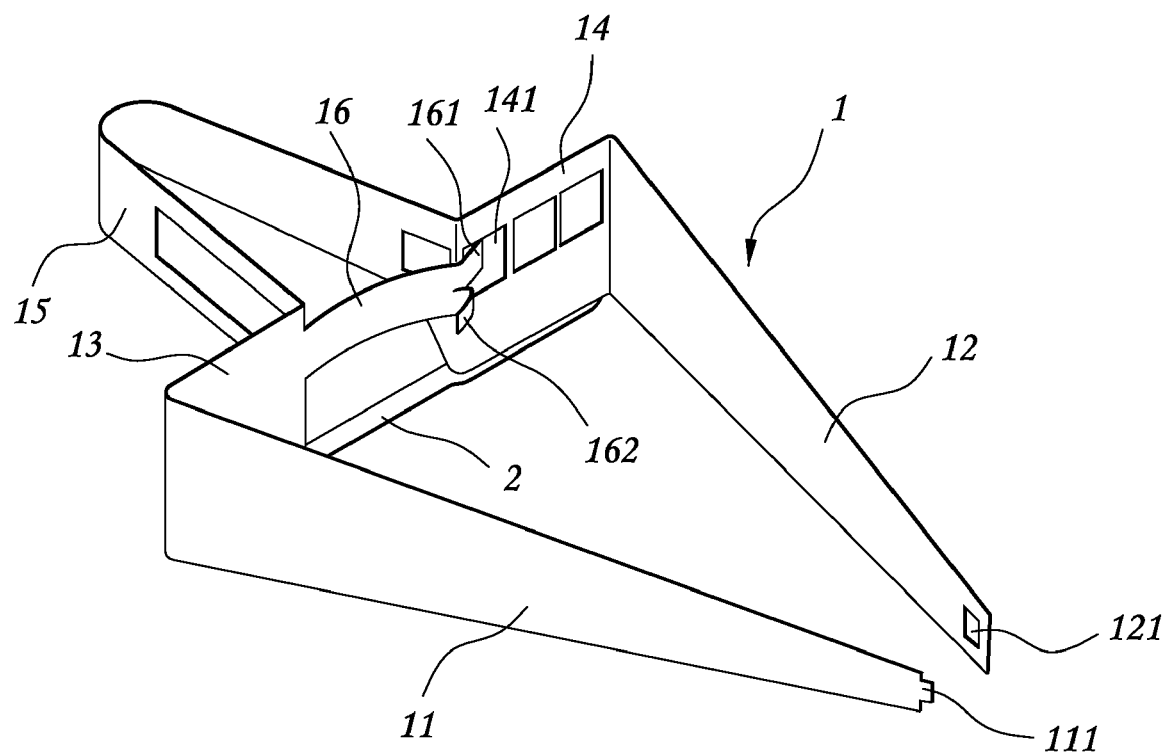
FIG. 2 is another elevational view of the present invention, showing the retaining tip disengaged from the retaining hole.
Figure 3:
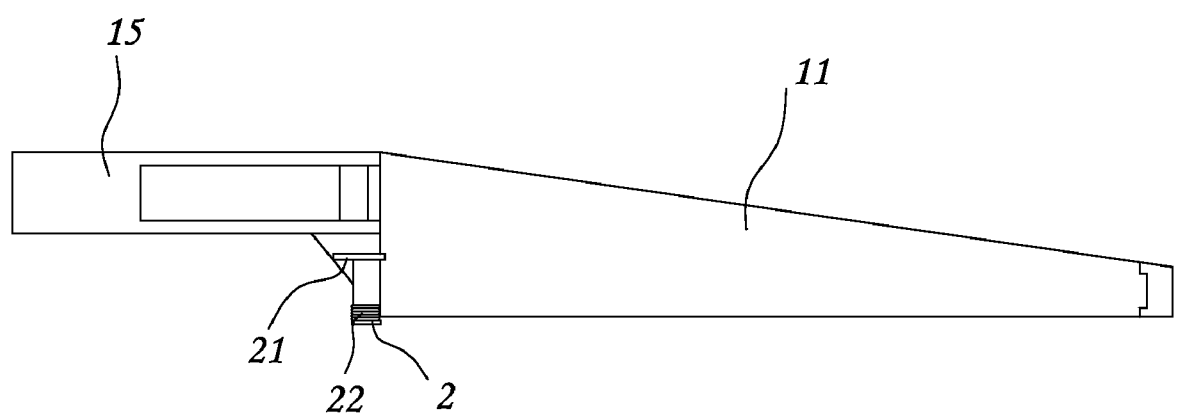
FIG. 3 is a side plain view of the adjustable cake cutter in accordance with the present invention.

Referring to FIGS. 1 and 2, an adjustable cake cutter in accordance with the present invention is shown comprised of a cutter body 1, a bearing member 2, a lever 21, and a torsional spring 22. The cutter body 1 is a one-piece metal member made of a metal sheet material, for example, stainless steel sheet, through a metal stamping and bending process. The cutter body 1 comprises a first cutter blade 11, a retaining tip 111 extending from one end of the first cutter blade 11, a second cutter blade 12, a retaining hole 121 formed in one end of the second cutter blade 12 for securing the retaining tip 111, a substantially V-shaped handle 15 extending in direction reversed to the first cutter blade 11 and the second cutter blade 12, a first shoulder 13 connected between the other end of the first cutter blade 11 and one end of the V-shaped handle 15, a second shoulder 14 connected between the other end of the second cutter blade 12 and the other end of the V-shaped handle 15, a connection arm 16 extending from the connection between the first shoulder 13 and one end of the V-shaped handle 15 and terminating in a backwardly curved finger strip 161 and a forwardly curved hook portion 162, and a plurality of locating holes 141 formed in the second shoulder 14 and arranged in a line in direction from one end of the second shoulder 14 adjacent to the second cutter blade 12 toward the other end of the second shoulder 14 remote from the second cutter blade 12 for receiving the hook portion 162 of the connection arm 16. Further, the size of each locating hole 141 is sufficient for allowing movement of the hook portion 162 therein in directions between the first cutter blade 11 and the second cutter blade 12.

The bearing member 2 is a narrow elongated bar pivotally connected with its one end to the bottom side of the first shoulder 13. The lever 21 is fixedly connected to the pivoted end of the bearing member 2. A person can operate the lever 21 to bias the bearing member 2 relative to the cutter body 1, moving the bearing member 2 in and out of the bottom side of the space surrounded by the first cutter blade 11, the second cutter blade 12, the first shoulder 13 and the second shoulder 14. The torsional spring 22 is connected between the cutter body 1 and the bearing member 2 to impart a force to the bearing member 2, keeping the bearing member 2 in a non-operative position outside the space surrounded by the first cutter blade 11, the second cutter blade 12, the first shoulder 13 and the second shoulder 14, i.e., in alignment with the first shoulder 13 and the second shoulder 14.

Figure 4A:
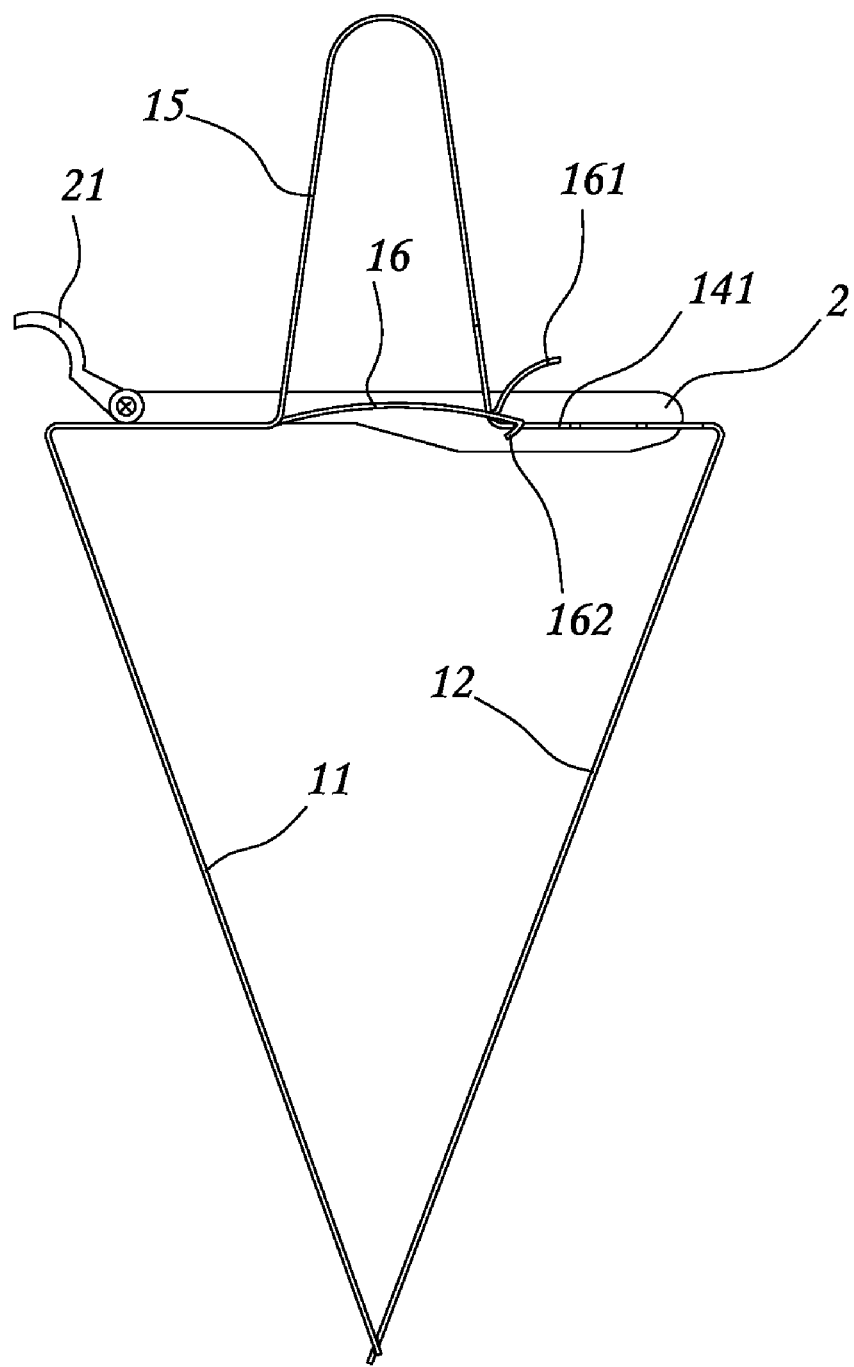
FIG. 4A is a schematic top view of the present invention, showing the hook portion of the connection arm fastened to the distal locating hole.
Figure 4B:
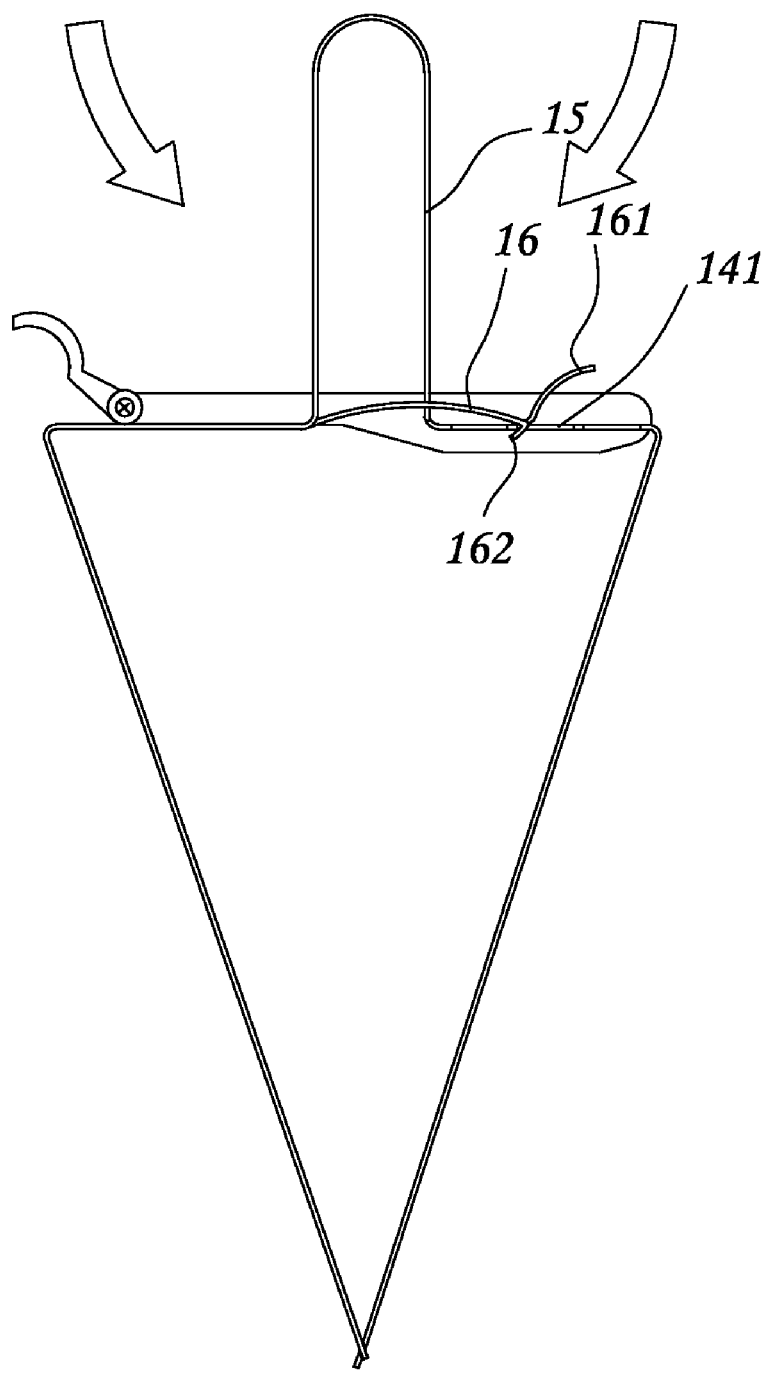
FIG. 4B corresponds to FIG. 4A, showing the hook portion of the connection arm shifted to one next locating hole.
Figure 4C:
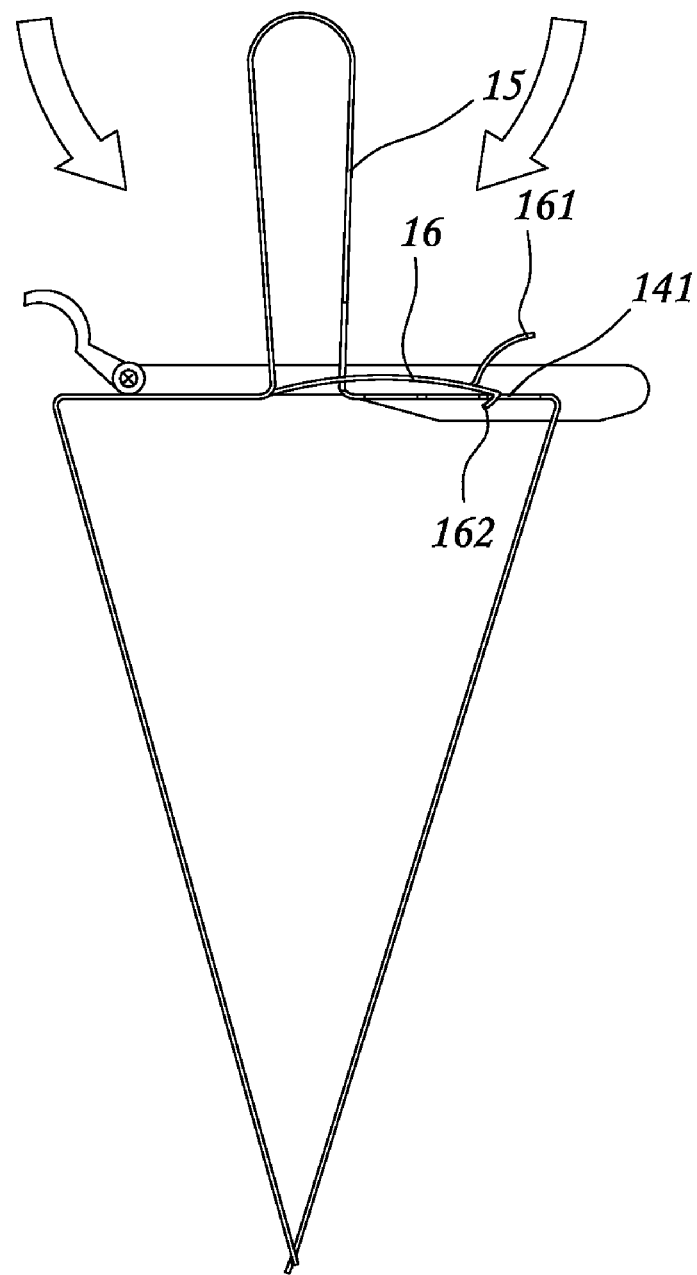
FIG. 4C corresponds to FIG. 4A, showing the hook portion of the connection arm shifted to the proximal locating hole.

Referring to FIGS. 4A–4C and FIG. 1 again, when in use, the retaining tip 111 is engaged into the retaining hole 121 to secure the free end of the first cutter blade 11 and the free end of the second cutter blade 12 together, and then the finger strip 161 is pulled by hand to move the hook portion 162 into engagement with one of the locating holes 141. At this time, the cutter blades 11 and 12 and the shoulders 13 and 14 define a sector space for picking up one sector part of a cake (not shown). By means of shifting the engagement between the hook portion 162 and the locating holes 141, the area of the sector space is relatively changed. When hooked the hook portion 162 in the distal locating hole 141 far from the second cutter blade 12, the area of the sector space surrounded by the cutter blades 11 and 12 and the shoulders 13 and 14 is the maximum (see FIG. 4A). When shifted the hook portion 162 to one next locating hole 141, the area of the sector space surrounded by the cutter blades 11 and 12 and the shoulders 13 and 14 is relatively reduced (see FIG. 4B). When shifted the hook portion 161 to the proximal locating hole 141 adjacent to the second cutter blade 12, the e area of the sector space surrounded by the cutter blades 11 and 12 and the shoulders 13 and 14 is the minimum (see FIG. 4C). Therefore, a user can conveniently shift the engagement between the hook portion 161 to the proximal locating hole 141 to adjust cut size.

Figure 5A:
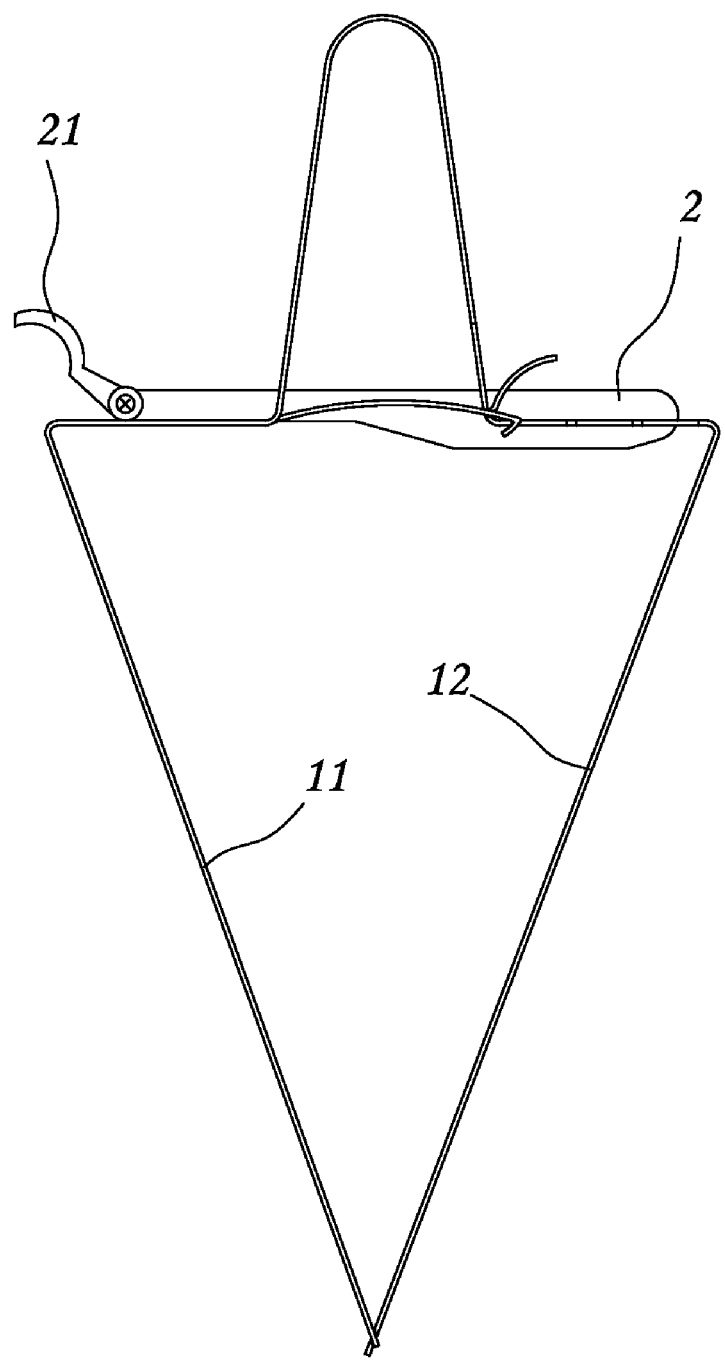
FIG. 5A is a schematic top plain view of the present invention, showing the bearing member in the non-operative position.
Figure 5B:
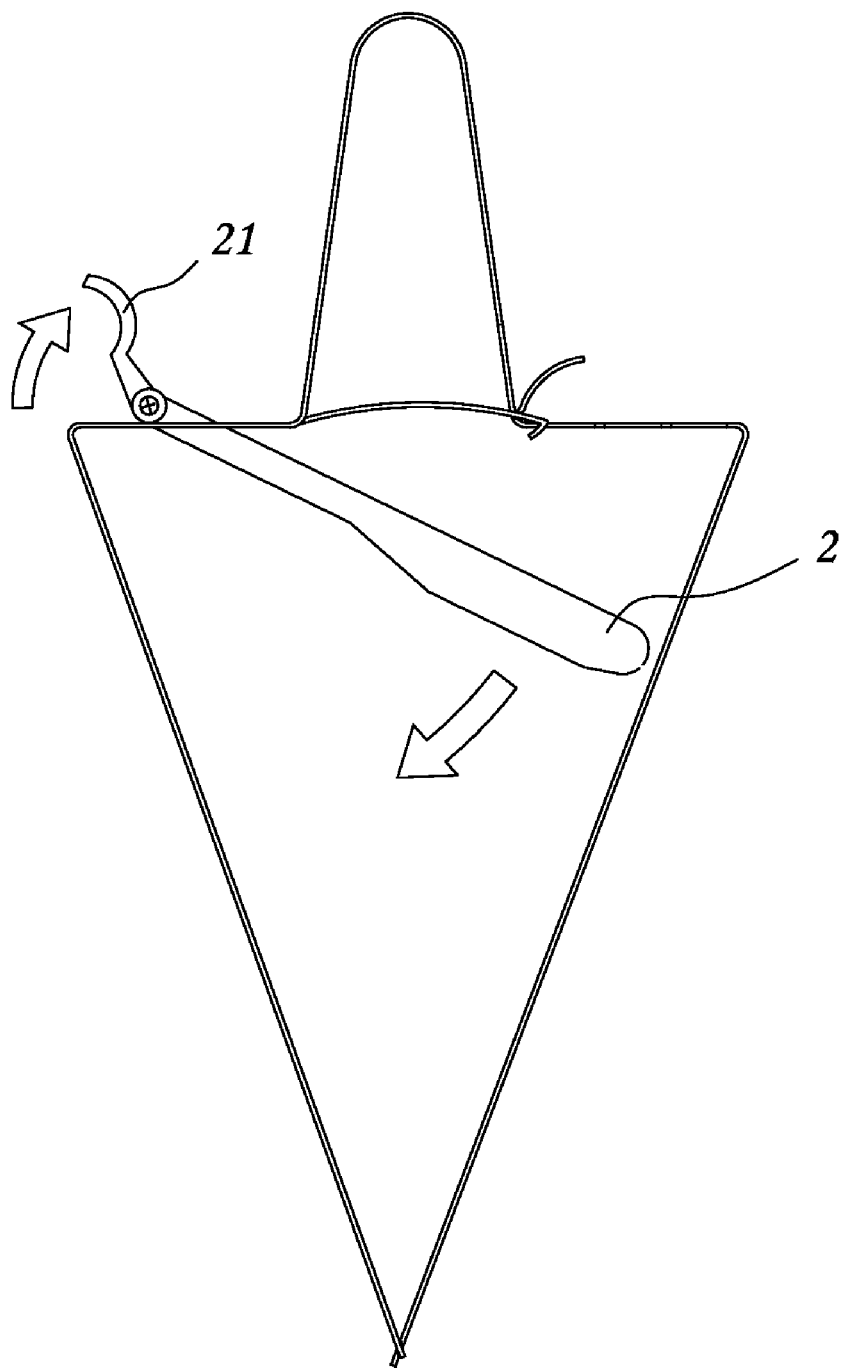
FIG. 5B corresponds to FIG. 5A, showing the bearing member biased.
Figure 5C:
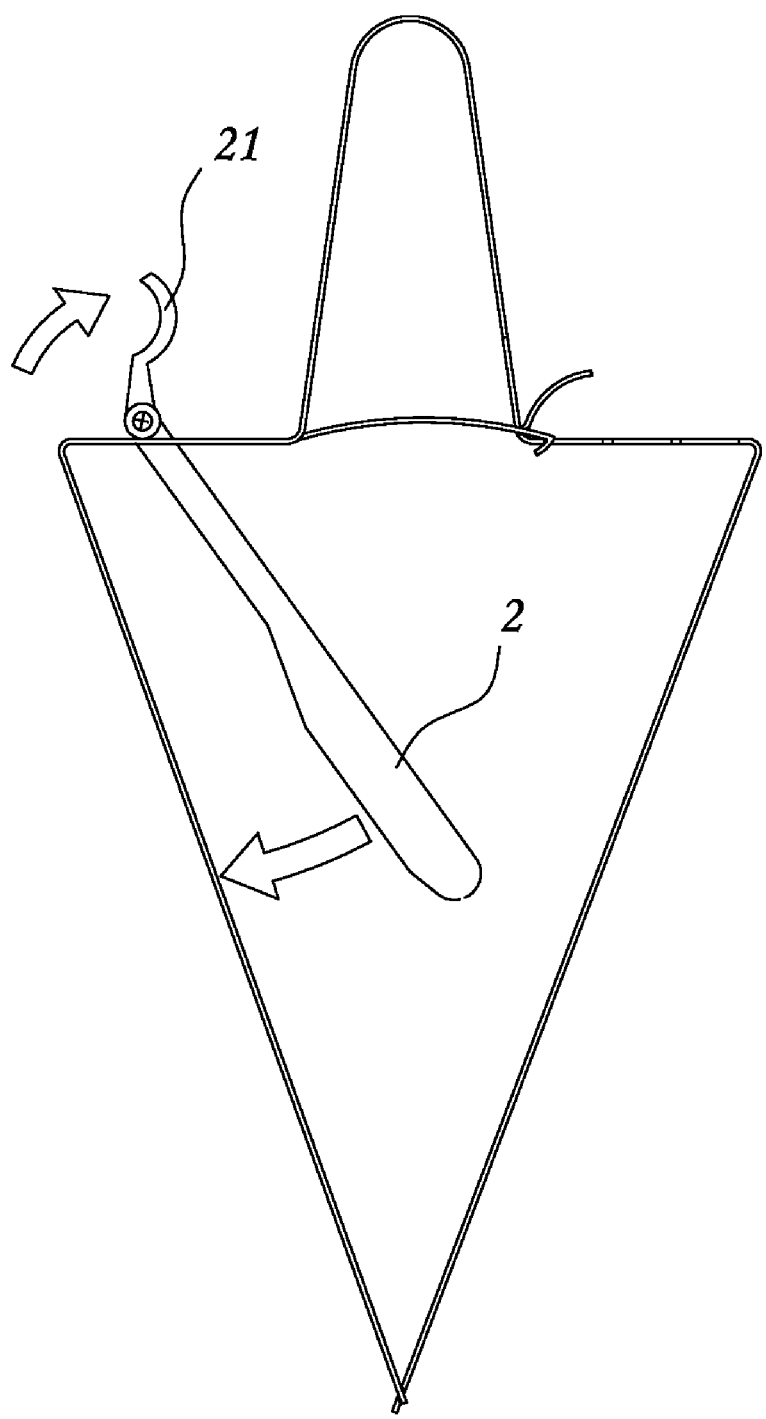
FIG. 5C corresponds to FIG. 5B, showing the bearing member biased further.

Referring to FIGS. 5A–5C and FIG. 1 again, after adjustment of cut size, insert the point of the adjustable cake cutter (the connected free ends of the first cutter blade 11 and second cutter member 12 of the cutter body 1) into the center of the cake in a vertical (or oblique) direction, and then lower the substantially V-shaped handle 15 of the cutter body 1 to force the bottom cutting edges of the first cutter blade 11 and second cutter blade 12 of the cutter body 1 into the cake, and then operate the lever 21 to bias the bearing blade 2 toward the bottom side of the cut piece of cake (see FIGS. 5B and 5C), and then lift the adjustable cake cutter from the cake, picking up the cut piece of cake. When lifting the adjustable cake cutter to pick up the cut piece of cake, the user can compress the V-shaped handle 15 to force the first cutter blade 11 and the second cutter blade 12 against the two opposite lateral sides of the cut piece of cake, so that the adjustable cake cutter positively picks up the cut piece of cake. When the piece of cake is to be removed from the adjustable cake cutter to a dish, a user releases the pressure from the V-shaped handle 15 and the lever 21. At this time, the bearing member 2 is returned to its former position by the torsional spring 22, allowing the cut piece of cake to fall from the adjustable cake cutter to the dish.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An adjustable cake cutter, comprising:
    a cutter body made of a metal sheet member through a metal stamping and bending process, said cutter body including a first cutter blade, said first cutter blade having a front end and a rear end opposite to the front end, and a retaining tip extending from the front end of said first cutter blade;
    a second cutter blade, said second cutter blade having a front end and a rear end opposite to the front end, and a retaining hole formed in the front end of said second cutter blade for securing said retaining tip;
    a substantially V-shaped handle extending in a direction opposite said first cutter blade and said second cutter blade, said V-shaped handle having a first end and a second end;
    a first shoulder connected between the rear end of said first cutter blade and the first end of said V-shaped handle;
    a second shoulder connected between the rear end of said second cutter blade and the second end of said V-shaped handle;
    a connection arm extending from the connection between said first shoulder and the first end of said V-shaped handle and terminating in a backwardly curved finger strip and a forwardly curved hook portion; and
    a plurality of locating holes formed in said second shoulder and arranged in a line in a direction from one end of said second shoulder adjacent to said second cutter blade toward an opposite end of said second shoulder remote from said second cutter blade for receiving the hook portion of said connection arm;
    a bearing bar pivotally attached to a bottom side of said first shoulder for bearing a cut piece of cake being cut by said first cutter blade and said second cutter blade from a cake; and
    a lever connected to one end of said bearing bar for operation by a person to move said bearing bar in and out of a bottom side of a space surrounded by said first cutter blade, said second cutter blade, said first shoulder and said second shoulder.

2. The adjustable cake cutter as claimed in claim 1, further comprising a torsional spring connected between said bearing bar and said cutter body and adapted to impart a biasing force on said bearing bar.

3. The adjustable cake cutter as claimed in claim 1, wherein each of said plurality of locating holes has a size sufficient for allowing movement of said hook portion therein in a direction between said first cutter blade and said second cutter blade.

* * * * *